United States Patent [19]

Malachesky

[11] 4,248,946
[45] Feb. 3, 1981

[54] CELL HAVING AN ALKALI METAL ANODE, A FLUORINATED CARBON CATHODE AND AN ELECTROLYTE WHICH INCLUDES AN ALKALI METAL HALIDE SALT AND A SOLVENT SYSTEM CONSISTING OF AN ETHER SOLVENT AND A CYCLIC CARBONATE COSOLVENT

[75] Inventor: Paul A. Malachesky, Berkeley Heights, N.J.

[73] Assignee: Exxon Research & Engineering Co., Florham Park, N.J.

[21] Appl. No.: 955,645

[22] Filed: Oct. 30, 1978

[51] Int. Cl.$^3$ .............................................. H01M 6/14
[52] U.S. Cl. ................................... 429/197; 429/199
[58] Field of Search ............... 429/194, 196, 197, 199, 429/218, 105, 101

[56] References Cited

U.S. PATENT DOCUMENTS

| 3,514,337 | 5/1970 | Braeuer et al. |
| 3,536,522 | 10/1970 | Cecil et al. |
| 3,704,174 | 11/1972 | Berger |
| 3,751,298 | 8/1973 | Senderoff |
| 3,877,984 | 4/1975 | Werth |
| 3,907,593 | 9/1975 | Marincic ............................. 429/196 |
| 3,923,543 | 12/1975 | Auborn et al. ....................... 429/196 |
| 3,997,900 | 12/1976 | Chin et al. ...................... 343/100 SA |
| 4,042,756 | 8/1977 | Goebel et al. ................... 429/194 X |
| 4,085,259 | 4/1978 | Lauck ................................... 429/194 |
| 4,104,451 | 8/1978 | Klemann et al. ...................... 429/194 |
| 4,105,836 | 8/1978 | Almerini ............................... 429/194 |
| 4,142,028 | 2/1979 | Leger et al. .......................... 429/194 |

OTHER PUBLICATIONS

N.I. Anufrieva et al., Tsuet. Metal., vol. 1, pp. 32–36 (1973).
W. Weppner et al., Physics Letters, vol. 58A, No. 4, pp. 245–248 (1976).
J. Schoonman et al., J. Solid Chem., vol. 16, pp. 413–422 (1976).

*Primary Examiner*—Anthony Skapars
*Attorney, Agent, or Firm*—Kenneth P. Glynn

[57] ABSTRACT

A novel electrochemical cell is disclosed utilizing an alkali metal anode, a fluorinated carbon cathode, and an electrolyte which includes an alkali metal halide salt and a mixed solvent system consisting of an ether and a cyclic carbonate. Preferred are the cells wherein the anode is lithium, the cathode is $C_2F$, and the electrolyte contains essentially of LiCl and a solvent system of dimethoxyethane and propylene carbonate.

22 Claims, No Drawings

CELL HAVING AN ALKALI METAL ANODE, A FLUORINATED CARBON CATHODE AND AN ELECTROLYTE WHICH INCLUDES AN ALKALI METAL HALIDE SALT AND A SOLVENT SYSTEM CONSISTING OF AN ETHER SOLVENT AND A CYCLIC CARBONATE COSOLVENT

BACKGROUND OF THE INVENTION

1. Field of the Invention

This invention relates to a novel electric current-producing cell. More particularly, this invention relates to improvements in the electric current producing cells of the type comprising an alkali metal anode, a cathode of a fluorinated carbon material, and an electrolyte which includes an alkali metal halide salt and a mixed solvent system consisting of an ether solvent and a cyclic carbonate cosolvent.

2. Description of the Prior Art

There has been considerable interest in recent years in developing high energy density electrochemical cell systems. Among the systems being investigated are those employing non-aqueous electrolytes including liquid and fused salt electrolytes, lithium anodes, and cathodes containing compounds of carbon, e.g., fluorinated carbon compounds. Typical systems are described, for example, in U.S. Pat. No. 3,536,522 and U.S. Pat. No. 3,514,337.

Additionally, various efforts have been made to develop solid state electrolytes for high energy density electrochemical cell systems. Alkali metal-aluminum-halogen compounds have been utilized in liquid and molten state electrolyte systems (e.g., as described in U.S. Pat. No. 3,877,984 and U.S. Pat. No. 3,751,298), and solid alkali metal-aluminum-halogen compound conductivity studies have been made (e.g., N. I. Anfrieva et al., Tsuet. Metal., Vol. 1, pp. 32–36 (1973); W. Weppner et al., Physics Letters, Vol. 58A, No. 4, pp. 245–248 (1976); and J. Schoonman et al., J. Solid Chem., Vol. 16, pp. 413–422 (1976)). Additionally, certain solvent complexed alkali metal salts have been described as useful solid electrolytes (see U.S. Pat. Nos. 3,704,174 and 3,997,900, for example). However, to date, there has been no suggestion that alkali metal halides may be employed as electrolyte salts in fluorinated carbon cathode cells as employed in the cells of the present invention.

SUMMARY OF THE INVENTION

A novel electric current-producing cell of the present invention has been developed which comprises: (a) an alkali metal anode; (b) a cathode comprised of fluorinated carbon; and (c) an electrolyte which includes an alkali metal halide salt and a mixed solvent system consisting of an ether solvent and a cyclic carbonate cosolvent.

DETAILED DESCRIPTION OF THE INVENTION

In the cell of present invention, an anode is employed which contains an anode-active material selected from the alkali metals. Desirably, the anode is substantially sodium, potassium, lithium or alloys containing these, and preferably the anode is lithium metal, or a lithium metal alloy. The alkali metal, for example lithium, may be in contact with other metal structures such as nickel, copper or silver screen, which serve as current collectors and are well known in the art.

The cathode in the current-producing cell of the present invention is one which contains as its cathode-active material a compound of carbon and fluorine. Included are any of the well-known fluorinated carbon cathodes such as those prepared from any of the conductive carbons and especially the $(C_yF)_n$ types, where y represents the atomic ratio of carbon to fluorine, e.g., a small fraction to an integer less than 10, and n is the number of $(CF_y)$ units in the molecule, e.g., 1 to very large numbers. Among these, the $C_2F$ cathode is desirable in the cell of the present invention. Advantageously, the $C_2F$ type cathode may be one which is formed by reacting a crystalline form of carbon such as natural or pyrolytic graphite, with an interhalogen fluoride in the presence of hydrogen fluoride. These interhalogen fluorides include those selected from $ClF_3$, $ClF_5$, $BrF_3$, $BrF_5$, $ICl$ and $IF_5$, particularly $ClF_3$. However, the cathode-active material may be prepared by any known method such as treatment of carbon with fluorine gas at elevated temperatures or simply by suspending the carbon, such as graphite, in liquid hydrogen fluoride and thereafter adding an interhalogen compound for a time sufficient for it to react with the carbon compound.

The electrolyte employed in the novel cell of the one which includes an alkali metal halide salt and a mixed solvent system consisting of an ether solvent and a cyclic carbonate cosolvent. The alkali metal halogen salt is one or more having the formula:

$$ZX \qquad (1)$$

wherein Z is an alkali metal and wherein X is a halogen selected from the group consisting of chlorine and fluorine. Desirably, the alkali metal Z in Formula (1) above is selected from lithium, sodium, and potassium. Preferred is lithium. The halogen X in Formula (1) is preferably chlorine. Among the specific alklai metal halide salts included are: LiCl; LiF; NaF; NaCl; KCl and the like. The most preferred compounds are LiCl and LiF, particularly LiCl.

The ether solvent used in the electrolyte of the present invention is any ether which will permit the migration of ions between the anode and the cathode of the cell when utilized in conjunction with the mentioned electrolyte salt and the cyclic carbonate cosolvent, or mixtures of such ethers. Desirably, the ether solvent is one or more ethers selected from the group consisting of dimethoxyethane, diglyme and triglyme, with DME being preferred.

As mentioned, in addition to the alkali metal halide salt and the ether solvent, the electrolyte of the cell of the present invention includes a cyclic carbonate solvent. This cosolvent may be any cyclic carbonate solvent which is compatible with the ether solvent and which will act to protect the alkali metal anode from possible reaction with the substituted amide. This is believed to be accomplished by the passivation of the alkali metal anode, e.g., by the formation of a thin layer of a lithium compound resulting from interaction with the cosolvent. Among the cyclic carbonates which may be used are ethylene carbonate (EC) and propylene carbonate (PC), etc. Thus, the alkali metal anode may be passivated by the formation of an alkali metal carbonate, e.g., $Li_2CO_3$.

In general, the electrolyte will contain about 20 to about 80 percent of the ether solvent by volume based on the total mixed solvent system volume, and about 80 to about 20 percent by volume of cyclic carbonate cosolvent. Preferably, about 40 to about 60 percent by volume of the solvent system is ether, remainder being cyclic carbonate cosolvent.

The alkali metal halide salt used in the electrolyte is generally employed in any amount sufficient to render the cell operable. As a practical matter, the salt may be used in amounts of about 0.5 M to about 2 M, based on solubility and conductivity considerations, and preferably in amounts about 0.75 M to about 1.2 M.

There is no criticality to the order in which the various components of the electrolyte are combined except that it is desirable to include the alkali metal-protecting cosolvent in the electrolyte solution before it is brought into contact with alkali metal anode.

The hardward used to associate the anode, electrolyte and cathode with one another to form the cell as in the present invention may be any which is known in the art and is a matter of design choice. For example, the cathode material could be pressed into the base of a button cell can, electrolyte added, and a cover containing the lithium anode sealed to the can by conventional and well-known techniques.

The present invention is more fully developed by the following examples. These examples are presented for purposes of illustration, and the invention should not be construed to be limited thereto.

EXAMPLE 1

A series of electrolytes were prepared by adding sufficient solid LiCl to prepare saturated solutions of LiCl in various solvent mixtures (prepared on a volume percent basis) using PC and DME. The resulting electrolyte resistivities are shown in Table I. The minimum resistivity was obtained at a solvent composition to 40 v/o PC-60 v/o DME.

TABLE I

| RESISTIVITY DATA FOR EXAMPLE 1 | |
|---|---|
| Solvent System | Resistivity - Ohm cm |
| PC | 6000 |
| 80 v/o PC-20 v/o DME | 2500 |
| 60 v/o PC-40 v/o DME | 1900 |
| 40 v/o PC-60 v/o DME | 1600 |
| 20 v/o PC-80 v/o DME | 4400 |

EXAMPLE 2

A saturated solution of LiCl in a 40 v/o PC-60 v/o DME mixed solvent was prepared as in Example 1 and used in three Li/$C_2F$ cells (A-1, A-2, and A-3) as follows:

About 0.4 grams of an 85 weight percent $C_2F$, 10 weight percent Vulcan XC72 (a conductive carbon sold by Cabot Corporation of Boston, Mass.), and 5 weight percent TFE mixture was pressed into the bottom of a one-inch diameter tantalum can. A glass fiber disc (Gelman Type A/E, 18 mil., produced by Gelman Instrument Co., of Ann Arbor, Mich.) was placed on top of the cathode cake along with a layer of TFE-bonded glass fiber. The electrolyte was then added, followed by an addition of a lid containing a 15 mil Li anode, and sealing the cell by the usual crimping methods. For comparison, another group of three cells (B-1, B-2, and B-3) were fabricated in an identical manner, but using an electrolyte of 0.5 M $LiClO_4$ in a 40 v/o PC-60 v/o DME solvent.

The open circuit voltages and cell impedances (measured at 1 kilohertz) for the two groups of cells are shown in Table II. While the cell impedance values for the LiCl containing cells are higher than the impedance values for the $LiClO_4$ containing cells, they will not effect low rate cell discharge performance.

TABLE II

| OCV AND CELL IMPEDANCE DATA FOR EXAMPLE 2 | | |
|---|---|---|
| Cell | OCV, Volts | Impedance, Ohms |
| A-1 | 3.86 | 39 |
| A-2 | 3.85 | 45 |
| A-3 | 3.83 | 59 |
| B-1 | 3.96 | 22 |
| B-2 | 3.99 | 23 |
| B-3 | 3.99 | 15 |

EXAMPLE 3

Three Li/$C_2F$ cells were prepared as in Example 2 using saturated LiCl in 40 v/o PC-60 v/o DME solvent. These cells were then discharged through a 10 Kohm load to 1.5 V. Table III shows the capacity values obtained. In these cells, which were cathode limited, between 87–97% material utilization was observed.

TABLE III

| DISCHARGE DATA FOR Li/$C_2F$ CELLS OF EXAMPLE 3 | | |
|---|---|---|
| Cell | Theoretical Capacity, mAhrs | Delivered Capacity, mAhrs |
| C | 167 | 150 |
| D | 167 | 146 |
| E | 170 | 165 |

What is claimed is:

1. A current producing cell, comprising:
   (a) an anode containing alkali metal as its anode-active material;
   (b) a cathode containing as a cathode-active material a compound of fluorine and carbon; and,
   (c) an electrolyte containing:
      (i) a mixed solvent system consisting of about 20 to about 80 percent by volume, based on the total solvent volume, of one or more ethers, and about 80 to about 20 percent by volume, based on the total solvent volume, of one or more cyclic carbonate cosolvents; and,
      (ii) one or more alkali metal halide salts having the formula:

ZX wherein Z in an alkali metal and wherein X is a halogen selected from the group consisting of chlorine and fluorine.

2. The cell of claim 1 wherein the anode is substantially lithium, sodium, potassium, or alloys containing these, and wherein Z is selected from the group consisting of lithium, sodium and potassium.

3. The cell of claim 2 wherein X is chlorine.

4. The cell of claim 1 wherein the cathode is fluorinated crystalline carbon material.

5. The cell of claim 4 wherein the anode is substantially lithium, sodium, potassium, or alloys containing these, wherein Z is selected from the group consisting of lithium, sodium and potassium, and wherein said ether solvent is one or more ethers selected from the

CELL HAVING AN ALKALI METAL ANODE, A FLUORINATED CARBON CATHODE AND AN ELECTROLYTE WHICH INCLUDES AN ALKALI METAL HALIDE SALT AND A SOLVENT SYSTEM CONSISTING OF AN ETHER SOLVENT AND A CYCLIC CARBONATE COSOLVENT

BACKGROUND OF THE INVENTION

1. Field of the Invention

This invention relates to a novel electric current-producing cell. More particularly, this invention relates to improvements in the electric current producing cells of the type comprising an alkali metal anode, a cathode of a fluorinated carbon material, and an electrolyte which includes an alkali metal halide salt and a mixed solvent system consisting of an ether solvent and a cyclic carbonate cosolvent.

2. Description of the Prior Art

There has been considerable interest in recent years in developing high energy density electrochemical cell systems. Among the systems being investigated are those employing non-aqueous electrolytes including liquid and fused salt electrolytes, lithium anodes, and cathodes containing compounds of carbon, e.g., fluorinated carbon compounds. Typical systems are described, for example, in U.S. Pat. No. 3,536,522 and U.S. Pat. No. 3,514,337.

Additionally, various efforts have been made to develop solid state electrolytes for high energy density electrochemical cell systems. Alkali metal-aluminum-halogen compounds have been utilized in liquid and molten state electrolyte systems (e.g., as described in U.S. Pat. No. 3,877,984 and U.S. Pat. No. 3,751,298), and solid alkali metal-aluminum-halogen compound conductivity studies have been made (e.g., N. I. Anfrieva et al., Tsuet. Metal., Vol. 1, pp. 32–36 (1973); W. Weppner et al., Physics Letters, Vol. 58A, No. 4, pp. 245–248 (1976); and J. Schoonman et al., J. Solid Chem., Vol. 16, pp. 413–422 (1976)). Additionally, certain solvent complexed alkali metal salts have been described as useful solid electrolytes (see U.S. Pat. Nos. 3,704,174 and 3,997,900, for example). However, to date, there has been no suggestion that alkali metal halides may be employed as electrolyte salts in fluorinated carbon cathode cells as employed in the cells of the present invention.

SUMMARY OF THE INVENTION

A novel electric current-producing cell of the present invention has been developed which comprises: (a) an alkali metal anode; (b) a cathode comprised of fluorinated carbon; and (c) an electrolyte which includes an alkali metal halide salt and a mixed solvent system consisting of an ether solvent and a cyclic carbonate cosolvent.

DETAILED DESCRIPTION OF THE INVENTION

In the cell of present invention, an anode is employed which contains an anode-active material selected from the alkali metals. Desirably, the anode is substantially sodium, potassium, lithium or alloys containing these, and preferably the anode is lithium metal, or a lithium metal alloy. The alkali metal, for example lithium, may be in contact with other metal structures such as nickel, copper or silver screen, which serve as current collectors and are well known in the art.

The cathode in the current-producing cell of the present invention is one which contains as its cathode-active material a compound of carbon and fluorine. Included are any of the well-known fluorinated carbon cathodes such as those prepared from any of the conductive carbons and especially the $(C_yF)_n$ types, where y represents the atomic ratio of carbon to fluorine, e.g., a small fraction to an integer less than 10, and n is the number of $(CF_y)$ units in the molecule, e.g., 1 to very large numbers. Among these, the $C_2F$ cathode is desirable in the cell of the present invention. Advantageously, the $C_2F$ type cathode may be one which is formed by reacting a crystalline form of carbon such as natural or pyrolytic graphite, with an interhalogen fluoride in the presence of hydrogen fluoride. These interhalogen fluorides include those selected from $ClF_3$, $ClF_5$, $BrF_3$, $BrF_5$, $ICl$ and $IF_5$, particularly $ClF_3$. However, the cathode-active material may be prepared by any known method such as treatment of carbon with fluorine gas at elevated temperatures or simply by suspending the carbon, such as graphite, in liquid hydrogen fluoride and thereafter adding an interhalogen compound for a time sufficient for it to react with the carbon compound.

The electrolyte employed in the novel cell of the one which includes an alkali metal halide salt and a mixed solvent system consisting of an ether solvent and a cyclic carbonate cosolvent. The alkali metal halogen salt is one or more having the formula:

$$ZX \qquad (1)$$

wherein Z is an alkali metal and wherein X is a halogen selected from the group consisting of chlorine and fluorine. Desirably, the alkali metal Z in Formula (1) above is selected from lithium, sodium, and potassium. Preferred is lithium. The halogen X in Formula (1) is preferably chlorine. Among the specific alklai metal halide salts included are: LiCl; LiF; NaF; NaCl; KCl and the like. The most preferred compounds are LiCl and LiF, particularly LiCl.

The ether solvent used in the electrolyte of the present invention is any ether which will permit the migration of ions between the anode and the cathode of the cell when utilized in conjunction with the mentioned electrolyte salt and the cyclic carbonate cosolvent, or mixtures of such ethers. Desirably, the ether solvent is one or more ethers selected from the group consisting of dimethoxyethane, diglyme and triglyme, with DME being preferred.

As mentioned, in addition to the alkali metal halide salt and the ether solvent, the electrolyte of the cell of the present invention includes a cyclic carbonate solvent. This cosolvent may be any cyclic carbonate solvent which is compatible with the ether solvent and which will act to protect the alkali metal anode from possible reaction with the substituted amide. This is believed to be accomplished by the passivation of the alkali metal anode, e.g., by the formation of a thin layer of a lithium compound resulting from interaction with the cosolvent. Among the cyclic carbonates which may be used are ethylene carbonate (EC) and propylene carbonate (PC), etc. Thus, the alkali metal anode may be passivated by the formation of an alkali metal carbonate, e.g., $Li_2CO_3$.

In general, the electrolyte will contain about 20 to about 80 percent of the ether solvent by volume based on the total mixed solvent system volume, and about 80 to about 20 percent by volume of cyclic carbonate cosolvent. Preferably, about 40 to about 60 percent by volume of the solvent system is ether, remainder being cyclic carbonate cosolvent.

The alkali metal halide salt used in the electrolyte is generally employed in any amount sufficient to render the cell operable. As a practical matter, the salt may be used in amounts of about 0.5 M to about 2 M, based on solubility and conductivity considerations, and preferably in amounts about 0.75 M to about 1.2 M.

There is no criticality to the order in which the various components of the electrolyte are combined except that it is desirable to include the alkali metal-protecting cosolvent in the electrolyte solution before it is brought into contact with alkali metal anode.

The hardward used to associate the anode, electrolyte and cathode with one another to form the cell as the present invention may be any which is known in the art and is a matter of design choice. For example, the cathode material could be pressed into the base of a button cell can, electrolyte added, and a cover containing the lithium anode sealed to the can by conventional and well-known techniques.

The present invention is more fully developed by the following examples. These examples are presented for purposes of illustration, and the invention should not be construed to be limited thereto.

EXAMPLE 1

A series of electrolytes were prepared by adding sufficient solid LiCl to prepare saturated solutions of LiCl in various solvent mixtures (prepared on a volume percent basis) using PC and DME. The resulting electrolyte resistivities are shown in Table I. The minimum resistivity was obtained at a solvent composition to 40 v/o PC-60 v/o DME.

TABLE I

| RESISTIVITY DATA FOR EXAMPLE 1 | |
|---|---|
| Solvent System | Resistivity - Ohm cm |
| PC | 6000 |
| 80 v/o PC-20 v/o DME | 2500 |
| 60 v/o PC-40 v/o DME | 1900 |
| 40 v/o PC-60 v/o DME | 1600 |
| 20 v/o PC-80 v/o DME | 4400 |

EXAMPLE 2

A saturated solution of LiCl in a 40 v/o PC-60 v/o DME mixed solvent was prepared as in Example 1 and used in three $Li/C_2F$ cells (A-1, A-2, and A-3) as follows:

About 0.4 grams of an 85 weight percent $C_2F$, 10 weight percent Vulcan XC72 (a conductive carbon sold by Cabot Corporation of Boston, Mass.), and 5 weight percent TFE mixture was pressed into the bottom of a one-inch diameter tantalum can. A glass fiber disc (Gelman Type A/E, 18 mil., produced by Gelman Instrument Co., of Ann Arbor, Mich.) was placed on top of the cathode cake along with a layer of TFE-bonded glass fiber. The electrolyte was then added, followed by an addition of a lid containing a 15 mil Li anode, and sealing the cell by the usual crimping methods. For comparison, another group of three cells (B-1, B-2, and B-3) were fabricated in an identical manner, but using an electrolyte of 0.5 M $LiClO_4$ in a 40 v/o PC-60 v/o DME solvent.

The open circuit voltages and cell impedances (measured at 1 kilohertz) for the two groups of cells are shown in Table II. While the cell impedance values for the LiCl containing cells are higher than the impedance values for the $LiClO_4$ containing cells, they will not effect low rate cell discharge performance.

TABLE II

| OCV AND CELL IMPEDANCE DATA FOR EXAMPLE 2 | | |
|---|---|---|
| Cell | OCV, Volts | Impedance, Ohms |
| A-1 | 3.86 | 39 |
| A-2 | 3.85 | 45 |
| A-3 | 3.83 | 59 |
| B-1 | 3.96 | 22 |
| B-2 | 3.99 | 23 |
| B-3 | 3.99 | 15 |

EXAMPLE 3

Three $Li/C_2F$ cells were prepared as in Example 2 using saturated LiCl in 40 v/o PC-60 v/o DME solvent. These cells were then discharged through a 10 Kohm load to 1.5 V. Table III shows the capacity values obtained. In these cells, which were cathode limited, between 87-97% material utilization was observed.

TABLE III

| DISCHARGE DATA FOR $Li/C_2F$ CELLS OF EXAMPLE 3 | | |
|---|---|---|
| Cell | Theoretical Capacity, mAhrs | Delivered Capacity, mAhrs |
| C | 167 | 150 |
| D | 167 | 146 |
| E | 170 | 165 |

What is claimed is:

1. A current producing cell, comprising:
   (a) an anode containing alkali metal as its anode-active material;
   (b) a cathode containing as a cathode-active material a compound of fluorine and carbon; and,
   (c) an electrolyte containing:
      (i) a mixed solvent system consisting of about 20 to about 80 percent by volume, based on the total solvent volume, of one or more ethers, and about 80 to about 20 percent by volume, based on the total solvent volume, of one or more cyclic carbonate cosolvents; and,
      (ii) one or more alkali metal halide salts having the formula:

ZX wherein Z in an alkali metal and wherein X is a halogen selected from the group consisting of chlorine and fluorine.

2. The cell of claim 1 wherein the anode is substantially lithium, sodium, potassium, or alloys containing these, and wherein Z is selected from the group consisting of lithium, sodium and potassium.

3. The cell of claim 2 wherein X is chlorine.

4. The cell of claim 1 wherein the cathode is fluorinated crystalline carbon material.

5. The cell of claim 4 wherein the anode is substantially lithium, sodium, potassium, or alloys containing these, wherein Z is selected from the group consisting of lithium, sodium and potassium, and wherein said ether solvent is one or more ethers selected from the group consisting of dimethoxyethane, diglyme and triglyme.

6. The cell of claim 5 wherein said alkali metal halide salt is LiCl.

7. The cell of claim 6 wherein the cathode is $C_2F$, wherein the anode is substantially lithium, or a lithium alloy.

8. The cell of claim 7 wherein said ether solvent is dimethoxyethane.

9. The cell of claim 8 wherein aid cyclic carbonate is propylene carbonate.

10. An electric cell comprising:
   (a) a lithium metal-containing anode;
   (b) a cathode containing a cathode-active material formed by reacting graphite with chlorine trifluoride in the presence of HF; and
   (c) and electrolyte containing:
      (i) a solvent system consisting of about 20 to about 80 percent by volume, based on the total solvent volume, of one or more ethers, and about 80 to about 20 percent by volume, based on the total solvent volume, of one or more cyclic carbonate cosolvents; and,
      (ii) one or more alkali metal halide salts having the formula:

ZX wherein Z is an alkali metal and wherein X is a halogen selected from the group consisting of chlorine and fluorine.

11. The cell of claim 10 wherein Z is selected from the group consisting of lithium, sodium and potassium.

12. The cell of claim 11 wherein said ether solvent is one or more ethers selected from the group consisting of dimethoxyethane, diglyme and triglyme.

13. The cell of claim 12 wherein X is chlorine.

14. The cell of claim 13 wherein said alkali metal halide salt is LiCl.

15. The cell of claim 14 wherein said ether solvent is dimethoxyethane.

16. The cell of claim 15 wherein said cyclic carbonate cosolvent is propylene carbonate.

17. The cell of claim 10 wherein about 40 to about 60 percent by volume of said solvent system is said ether solvent and about 60 to about 40 percent by volume is said cyclic.

18. The cell of claim 17 wherein Z is lithium.

19. The cell of claim 18 wherein said ether solvent is one or more ethers selected from the group consisting of dimethoxyethane, diglyme and triglyme.

20. The cell of claim 19 wherein said ether solvent is dimethoxyethane.

21. The cell of claim 20 wherein said cyclic carbonate cosolvent is propylene carbonate.

22. The cell of claim 21 wherein said alkali metal halide salt is LiCl.

* * * * *